Sept. 9, 1958 J. B. THOMSON 2,851,316
SLEEVE BEARING WITH PLASTIC LINER
Filed June 30, 1953
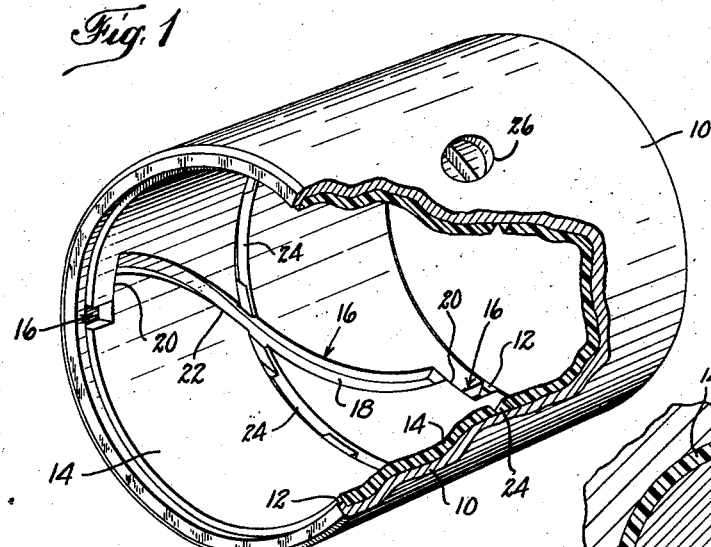
Fig. 1
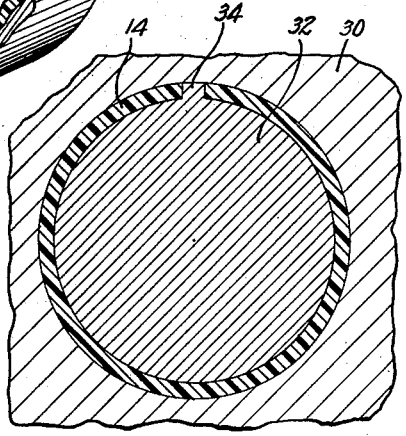
Fig. 4
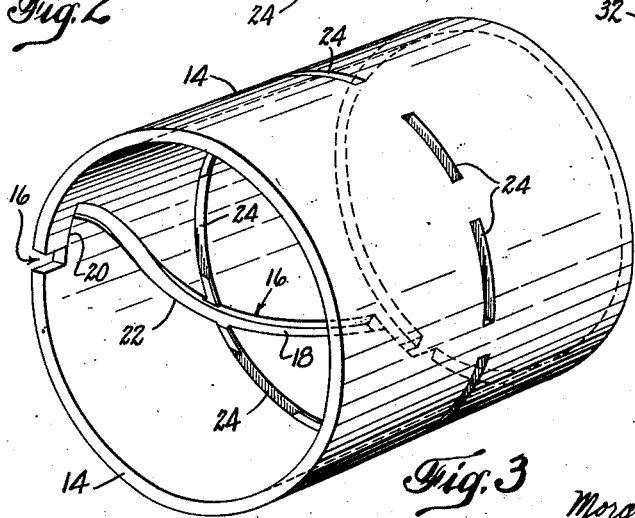
Fig. 2
Fig. 3
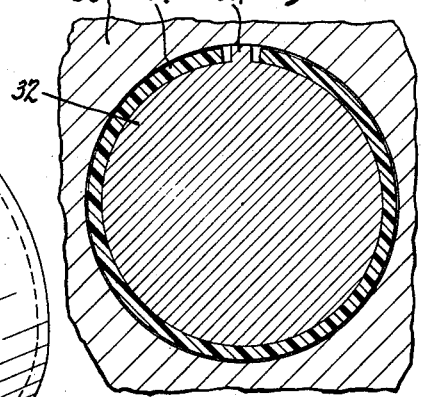
Fig. 5
INVENTOR.
JOHN B. THOMSON
BY
Morgan, Finnegan, Durham & Pine
ATTORNEYS.

United States Patent Office 2,851,316
Patented Sept. 9, 1958

2,851,316

SLEEVE BEARING WITH PLASTIC LINER

John B. Thomson, Manhasset, N. Y.

Application June 30, 1953, Serial No. 365,040

2 Claims. (Cl. 308—238)

The present invention relates to improvements in bearings, and more particularly to a novel and improved form of a sleeve type bushing which may be used for supporting a rotating or reciprocating member or a member which has both rotary and reciprocatory motion, the sleeve type bushing being formed of a flexible, tough, wear-resistant plastic composition.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Figure 1 is a perspective view showing a preferred and illustrative form of the present invention;

Figure 2 is a longitudinal sectional view through the bearing shown in Figure 1;

Figure 3 is a perspective view of the bushing liner forming part of the bearing shown in Figures 1 and 2;

Figure 4 is a schematic sectional view illustrating one step in the operation of molding the sleeve bushing of the present invention; and Figure 5 is a similar schematic view showing the bearing liner after it has cooled in the mold in which it was formed.

The present invention has for its object the provision of a novel and improved form of sleeve type bushing for relatively movable parts which has exceptional form stability, is extremely tough and wear-resistant, requires little or no lubrication, has an exceptionally high load rating, and is not readily subject to failure under severe operating conditions. A further object of the invention is the provision of a bearing formed from a wear-resistant, tough, flexible and resilient plastic material which can be economically manufactured, is consistent in its performance, can be accurately and closely fitted to the running shaft, has low friction and is of superior durability. Still another object is the provision of a thin flexible sleeve-type of bushing formed of wear-resistant plastic which can be used in many different applications, and is highly advantageous in many applications where little or no lubrication is possible. The invention also provides a novel and improved process for the production of such bearing liners or bushings in a uniform and economical manner.

In the past, bearings and journals have been formed from different flexible, resilient plastic compositions and have proved serviceable in certain limited applications where the bearings were not heavily loaded or were not subjected to other relatively heavy duty. In general, these bearings and journals have been formed by molding them as completely cylindrical bushings or tubes. After the cavity is filled in molding a structure of this type, and cooling begins, the material must shrink substantially. As the inner surface of the mold cavity prevents diametral shrinkage, the material contracts which causes molecular orientation or stretching in a circumferential direction. The stretching also sets up severe internal stresses within the material which are temporarily locked in as the material "freezes" within the mold upon cooling. Both the molecular orientation or stretching and the internal stresses have a very detrimental effect on the finished bearing. As the load on the bearing is perpendicular to the circumference, the bearing's capacity is lessened by a molecular orientation or stretching in a circumferential direction. Due to the tendency for plastics to cold-flow under stress, the locked-in stresses in a conventional plastic bearing will gradually relieve themselves by deforming the material. This results in a reduction in the working bore diameter and out-of-round deformation which closes in on the shaft causing a seizure which amounts to a complete bearing failure. This action is accelerated by any rise in the temperature due to operating conditions.

Other bearings have been described which provide a relatively thin, flexible layer of wear-resistant, resilient plastic composition fitted to and closely engaging the shaft member supported by the bearing sleeve. Such relatively thin, flexible sleeve-like bushings or journals, however, are durable and of high load-carrying capacity only when they are produced in accordance with the present invention and have the characteristics which are to be hereinafter described. Sleeve-like bushings or journals produced by conventional methods are of short life, have little load-carrying capacity and are readily subject to failure, and in addition are not readily accurately fitted to the shafts which they are intended to support.

As the result of tests on various flexible, tough, wear-resistant, resilient plastic compositions formed as bearing sleeves or journals, I have found that unexpectedly superior and uniform results are obtained when the sleeve-like bearing member or journal comprises an unoriented or unstretched plastic composition, the plastic composition being a wear-resistant, tough, resilient plastic composition which preferably has a molecularly non-linear structure. Also, orientation of the plastic composition substantially reduces its load carrying capacity as well as its durability under conditions of normal operation. I have further found that it is important to the formation of the most desirable and accurately fitted bearing sleeves or journals that they should be initially formed in substantially the cylindrical shape in which they are to be used, rather than being formed from strips or other flat sheet material as has heretofore been done. When formed from a flat strip, the ends will not lie against the supporting housing and tend to short-cut in a tangential direction, causing rubbing and subsequent seizure. Drilling of the bearing hole in a solid block of plastic composition does not provide a satisfactory bearing as microscopic tool marks and a machined surface are far inferior to the smooth, tough glazed surface obtained by molding. Such bearings which have heretofore been proposed and used have a relatively short life under comparatively moderate loading conditions, tend to seize when they are subjected to heavier than normal loads and do not allow for close fitting of the bearing to the supported shaft. In fact, heretofore, bearings formed of plastic compositions have been of relatively limited application and have been found unsuitable in many applications, especially where there were requirements for close fitting of the shaft to the bearing, or where any but the lightest duty was to be imposed on the bearing.

The bearings of the present invention are sometimes used in a lubricated condition, although in many instances lubrication may be dispensed with, and liquids which are normally corrosive may be used as lubricant in many instances.

Various flexible, tough, corneus, wear-resistant, resilient plastic compositions are suitable for use in the bearings of the present invention, including the synthetic linear, polyamide compositions (such as Du Pont's FM10001 nylon, FM3001 nylon, FM3604 nylon and other nylons), polyethylene, tetrafluoroethane, and the like.

In general, these plastic compositions are linear polymers which are susceptible to a relatively high degree of orientation when they are stretched as in cooling. According to the present invention, these plastic compositions are utilized in their unstretched, and usually correspondingly unoriented condition. A further characteristic of the bearing liners of the present invention is the fact that they do not tend to shrink circumferentially after fabrication due to cold flow or when subjected to an increase in temperature, even to the softening point of the plastic composition, which shrinkage would be accompanied by an increase in the thickness of the bearing liner in the case of a bearing liner similar to a split-bushing, while an unsplit-bushing or annular liner would be subjected to a decrease in its internal diameter and deformation when subject to these conditions. The bearing liners of the present invention thus do not shrink circumferentially, or distort, and are subjected to only a very slight increase in the thickness of the liner which is due solely to the normal and very slight thermal expansion of the plastic composition due to operating temperatures. As the bearing liners of the present invention are invariably split, either from end to end, or slotted with alternate slots extending from opposite ends and overlapping each other, no appreciable increase or decrease of the internal diameter can occur due to variations in the circumferential length resulting from temperature changes and moisture absorption which takes place during operation. The bearing of this invention therefore offers three major advantages of great importance to plastic bearings—it has greater load capacity, it is form stable, and the bore diameter will not vary significantly due to expansion and contraction of the material under operating conditions.

The structure of the bearings of this invention permits one or more splits to be formed helically or otherwise arranged so that it is impossible for a single radial load to apply over the entire split area. Moreover, the split can be used to distribute lubricant over the bearing surface in applications where lubrication is desired. In this case, the split can be provided with interengaging circumferentially extending ends which prevent the lubricant from running out the ends of the bearing and seal the bearing against the entrance of foreign matter. Annular oil distribution slots can be connected with the split so that lubricant will circulate circumferentially as well as axially.

The advantageous properties of the plastic composition bearing liners of the present invention result principally from the manner in which they are formed, and are principally due to the fact that the bearing liners are produced by the congealing of a more or less viscous, fluid, plastic composition, preferably a thermoplastic material, which when congealed forms a tough, wear-resistant, relatively flexible liner of substantially cylindrical shape, which is provided with at least one slit or gap interrupting the otherwise annular shape of the liner, the internal diameter of the annulus in its relaxed or unconfined condition being preferably slightly greater than the external diameter of the shaft to be supported and being sufficiently flexible so that the split ends of the annulus may be brought together with only a small amount of clearance between their ends as the bearing is fitted to the shaft to be supported. The flexibility of the plastic linear, its thickness and the normally relaxed shape of the liner are such that the liner, when deformed to its running condition is substantially cylindrical, with the split ends forming a smooth cylindrical surface except for the gap between the ends.

To accomplish these ends and to provide the improved bearing liner of the present invention, the bearing liners are preferably injection molded into a substantially cylindrical mold cavity, the cylindrical cavity of the mold being interrupted by a radial wall which prevents the formation of an uninterrupted cylinder, the internal diameter of the mold cavity being slightly larger than the external diameter of the shaft to be fitted to and supported by the bearing liner.

The bearing liners are preferably injection molded in the interrupted cylindrical cavity of the mold at a relatively high temperature, considerably above the softening point of the thermoplastic being used, and the mold cavity is filled with the flowing plastic in a substantially liquid condition. Thereafter, the plastic cools in the mold until it has congealed, and as it cools it shrinks, the amount of shrinkage depending on the temperature drop and on the coefficient of thermal expansion of the plastic composition being used. However, due to the radial wall in the mold, which serves to form the split in the otherwise cylindrical bearing liner, the liner is free to contract circumferentially as it cools and congeals, thereby allowing the plastic material to retain its unoriented condition, and at the same time forming a bearing liner which will not substantially shrink circumferentially, nor thicken radially nor deform due to cold flow or its temperature increasing even under severe operating conditions, and which will not change its bore diameter when the material expands and contracts under operating conditions.

It will be understood that the foregoing general description and the following detailed description as well are exemplary and explanatory of the invention but are not restrictive thereof.

Referring now in detail to the present preferred and illustrative embodiment of the invention as shown in the accompanying drawings, the invention is shown as applied to a journal or sleeve bearing provided with a relatively thin mounting sleeve which is adapted to be mounted and secured in a suitably apertured part, such as a frame member, and is adapted to support a cylindrical shaft member for relative motion.

As embodied, the bearing comprises a relatively thin metallic supporting sleeve or shell 10 of relatively thin metal and of generally cylindrical shape, provided with integral, inwardly turned, narrow flanges 12 at its ends so as to form retaining means for holding a bearing liner 14 within the sleeve 10 against axial movement, the extent of the flanges 12 being less than the thickness of the liner 14 to eliminate the possibility of contact between the inner edges of the flanges 12 and the shaft supported by the liner 14.

The liner 14 is preferably and illustratively formed as a relatively thin hollow cylinder having a uniform wall thickness and comprises a relatively thin cylindrical layer of a tough, wear-resistant, flexible and somewhat resilient plastic, such as molded nylon, the cylindrical layer being discontinuous, in that it is provided with at least one slit or narrow gap 16 which extends from one end of the bearing liner to the other, and is preferably arranged on a generally helical path providing at least a pair of circumferentially extending portions which are spaced a considerable distance apart.

Figure 3 shows the bearing liner 14 in its unsupported or substantially relaxed condition as it appears prior to its being inserted in its supporting sleeve 10. As shown the bearing liner 14 has a relaxed internal radius of curvature, at least near its ends, which is not more than about fifteen (15%) percent, and preferably not more than (10%) percent greater than the radius of the shaft which is to be supported by the liner. Thus, for a shaft having an external diameter of 1.000 inch, the internal diameter of the unsupported bearing liner will not exceed about 1.150 inches, and when supported will be compressed radially and circumferentially to have a diameter not exceeding about 1.003 inches, and preferably not more than 1.001 inches.

The radial thickness of the bearing liner 14 is preferably not more than twenty (20%) percent and more preferably about ten (10%) percent of the diameter of the shaft to be supported. As supported in its mounting sleeve 10, or a housing, the gap 16 provided between the adjacent edges of the cylindrical bearing liner 14 has a width which is preferably at least two (2%) percent of the circumference of the bearing liner 14.

The gap 16 preferably extends from one end or edge of the bearing liner 14 to the other end thereof and the two edges forming the gap 16 are circumferentially spaced so that no part of the gap at one end of the liner axially overlaps any part of the gap at the other end of the liner. Preferably the gap 16 is so formed as to provide a closed and substantially tight pocket 18 between its substantially complementarily shaped edges which can serve to hold a supply of lubricant without interfering with the circumferential relative movement of the edges of the bearing liner 14 as the liner circumferentially expands or contracts during operation.

As embodied, the adjacent edges of the liner 14 at the gap 16 extend inwardly a short distance in an axial direction, then extend circumferentially, as at 20, in substantial contact with each other, then extend on a generally helical path 22, contact with each other at another and oppositely circumferentially extending portion, and then extend axially to the end of the bearing liner. The circumferentially extending portions of the edges of liner 14 are in substantial contact with each other and allow circumferential expansion or contraction of the liner in use, while the axially extending and helically extending portions of the adjacent edges provide the gap 16 which has been referred to above, the helically extending portions 22 providing a pocket 18 for lubricant which is retained by the circumferentially extending portions 20. These interlocking ends also maintain axial alinement of the ends of the liner at its split or gap 16.

Means are provided for distributing lubricant circumferentially of the bearing liner, and for this purpose there are provided one or more circumferentially extending series of narrow slots 24, the liner portions between the ends of adjacent slots preferably being recessed for the flow of lubricant from one slot to another by shallow grooves formed either on the interior or the exterior of the bearing liner 14.

The supporting sleeve or housing 10 is preferably provided with an aperture 26 which is adapted to communicate with the lubricant pocket 18 via the slots 24 so that lubricant may be supplied to the bearing liner, as required.

As shown in Figures 1 and 2, the length of the bearing sleeve 14 is slightly less than the distance between the inner edges of the retaining flanges 12, to allow for axial expansion during operation, the bearing liner is resiliently compressed by the sleeve 10 and lies in contact therewith so that it has the desired internal diameter, and is slightly urged away from the supported shaft.

Figures 4 and 5 diagrammatically illustrate the molding of the bearing liners 14 by injection molding technique. As shown, the mold comprises the external part 30 and the core 32 which are dimensioned as required to produce the desired size of bearing liner. The core 32 is shown as provided with a dividing wall or key 34 which extends radially into substantial contact with the inner surface of the external part 30 of the mold thereby forming the gap 16, and at the same time dividing the mold cavity so that the formation of an endless cylindrical molded part is prevented.

Figure 4 shows the mold parts with the liner injection molded therein while still at molding temperature, usually at about 400° F. in the case of nylon. Figure 5 shows the mold parts with the molded liner 14 formed therein and after it has cooled sufficiently to allow the part to be removed from the mold. It will be noted, as shown in Figure 5, that the separate ends of the bearing liner 14 have separated slightly at the mold key or dividing wall 34 as the result of the thermal contraction of the molded plastic material of which the liner is formed.

By dividing the mold cavity and providing the gap 16 in the molded part, the bearing liner cools, contracts and assumes its final form without being subjected to any stretching of the molded material, thus allowing the molded part to be formed in an unoriented condition, and in such a molecular state that it does not exhibit the property of "memory" and has little tendency to assume any other shape than the shape which it has at the conclusion of the molding operation. Thus, the bearing liners of the present invention have an unusually high degree of dimensional and form stability, which has a surprisingly important effect on their operating characteristics.

When bearing liners are formed by slitting a cylindrical liner which has been molded in the form of an uninterrupted cylinder, these liners do not exhibit the desirable properties of the liners of the present invention; they gradually assume a smaller internal diameter, and this action is accelerated greatly in case the bearing liner is subjected to abnormal heat, as may easily occur in the case of overloading, in which case the bearing liner contracts circumferentially, thickens in a radial direction to a corresponding amount, and tends to seize upon the shaft as the liner cannot expand due to the relatively unvarying dimensions of the external sleeve 10. This defect, if foreseen, normally requires that the bearing liners be designed to provide an excessive clearance between the normal internal diameter of the liner and the external diameter of the supported shaft, thereby preventing the desirable close fit which should exist between a shaft and its bearings, and also greatly reducing the load carrying capacity of the bearing.

When bearing liners manufactured according to the present invention are subjected to a relatively high degree of heat in an unsupported condition, the shape does not change to a great extent, and the gap 16 usually does not vary greatly from its original size. More importantly, the liners of the present invention, because they have been molded without being subjected to circumferential stretching exhibit substantially no permanent change in their circumferential or their thickness dimension on cooling after being subjected to relatively high temperatures such as are experienced in operation. Thus, they are distinguished from the shortening and thickening which occurs with bearing liners which have been subjected to stretching or orientation during their molding.

The invention in its broader aspects is not limited to the specific mechanisms shown and described but departures may be made therefrom within the scope of the accompanying claims without departing from the principles of the invention and without sacrificing its chief advantages.

What is claimed is:

1. A cylindrical bearing comprising an outer housing, a separate, unitary inner liner and cooperating means holding the liner in the housing and preventing relative axial movement of the liner in the housing, said liner being made by injection molding of a tough, resilient plastic material, relatively thin in relation to its circumference, circumferentially movable in the housing as the liner expands and contracts during operation and being provided with a generally axially extending gap extending from end to end of the liner and of a width at least as great as the circumferential expansion of the liner in operation, and being further characterized in that: the inner surface of the liner is a molded surface, the liner is molded as an interrupted cylindrical shape which is unstretched whereby internal stresses and further circumferential shrinkage or distortion after fabrication are reduced.

2. A bearing, as claimed in claim 1, in which the adjacent edges of the liner at the gap are substantially complementary, said edges extending axially inwardly from one end of the liner, thence circumferentially in contact with each other, thence in a generally helical direction, thence in a circumferential direction in contact with each other, and thence to the other end of the liner, whereby a pocket for lubricant is provided between the ends of the liner and axial alignment of the split ends is maintained.

References Cited in the file of this patent

UNITED STATES PATENTS

| | | |
|---|---|---|
| 1,213,684 | Osterholm | Jan. 23, 1917 |
| 1,298,100 | Royce | Mar. 25, 1919 |
| 2,362,566 | Lappert | Nov. 14, 1944 |
| 2,409,958 | Rogers et al. | Oct. 22, 1946 |
| 2,448,676 | MacMillin et al. | Sept. 7, 1948 |
| 2,616,771 | Metzgar | Nov. 4, 1952 |
| 2,666,677 | Miller | Jan. 19, 1954 |
| 2,675,283 | Thomson | Apr. 13, 1954 |

FOREIGN PATENTS

| | | |
|---|---|---|
| 677,873 | Great Britain | Aug. 20, 1952 |

OTHER REFERENCES

Motor (Magazine), October 1951, page 90.